(12) United States Patent
Mueller

(10) Patent No.: US 6,663,196 B1
(45) Date of Patent: Dec. 16, 2003

(54) DEVICE AND METHOD FOR CONTROLLING WHEEL SLIP

(75) Inventor: Elmar Mueller, Markgroeningen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/914,632
(22) PCT Filed: Sep. 1, 2000
(86) PCT No.: PCT/DE00/02992
§ 371 (c)(1), (2), (4) Date: Aug. 30, 2001
(87) PCT Pub. No.: WO01/49540
PCT Pub. Date: Jul. 12, 2001

(30) Foreign Application Priority Data

Dec. 30, 1999 (DE) .......................... 199 63 748

(51) Int. Cl.$^7$ ............... B60T 8/32; G01B 7/02
(52) U.S. Cl. ............ 303/144; 303/166; 303/189; 303/191; 701/70
(58) Field of Search ............... 303/139, 144, 303/147, 153, 167, 175, 189, 166, 191; 701/70, 71

(56) References Cited

U.S. PATENT DOCUMENTS 5,255,194 A * 10/1993 Schaufelberger et al. ... 303/147
5,366,041 A * 11/1994 Shiraishi et al. ............ 180/233
6,185,497 B1 * 2/2001 Taniguchi et al. ........... 701/70
6,236,926 B1 * 5/2001 Naitou ....................... 303/189

FOREIGN PATENT DOCUMENTS

| DE | 38 27 883 | 2/1990 |
| DE | 38 41 295 | 6/1990 |
| DE | 42 19 750 | 12/1993 |
| DE | 199 37 964 | 2/2001 |

OTHER PUBLICATIONS

"FDR—Die Fahrdynamikregelung von Bosch" (ESP—The Electronic Stability Program of Bosch) appearing in the Automobiltechnische Zeitschrift (ATZ) 96, 1994, issue 11, on pp. 674 through 689.

* cited by examiner

Primary Examiner—Matthew C. Graham
(74) Attorney, Agent, or Firm—Kenyon & Kenyon

(57) ABSTRACT

A device for controlling the wheel slip, particularly for controlling the brake slip and/or the drive slip of individual wheels for a motor vehicle, by which a braking pressure applied to the vehicle wheels can be varied and/or set as a function of the movement behavior of the vehicle wheels, having means for braking, particularly for locking, at least the front wheels and/or the rear wheels of the motor vehicle in the event a skidding condition is detected, the vehicle having wheel-speed sensors (5) whose signals contain information about the direction of rotation of the respective wheel, these signals being processed within the framework of a skid detection.

6 Claims, 2 Drawing Sheets

DEVICE AND METHOD FOR CONTROLLING WHEEL SLIP

Figure 1:
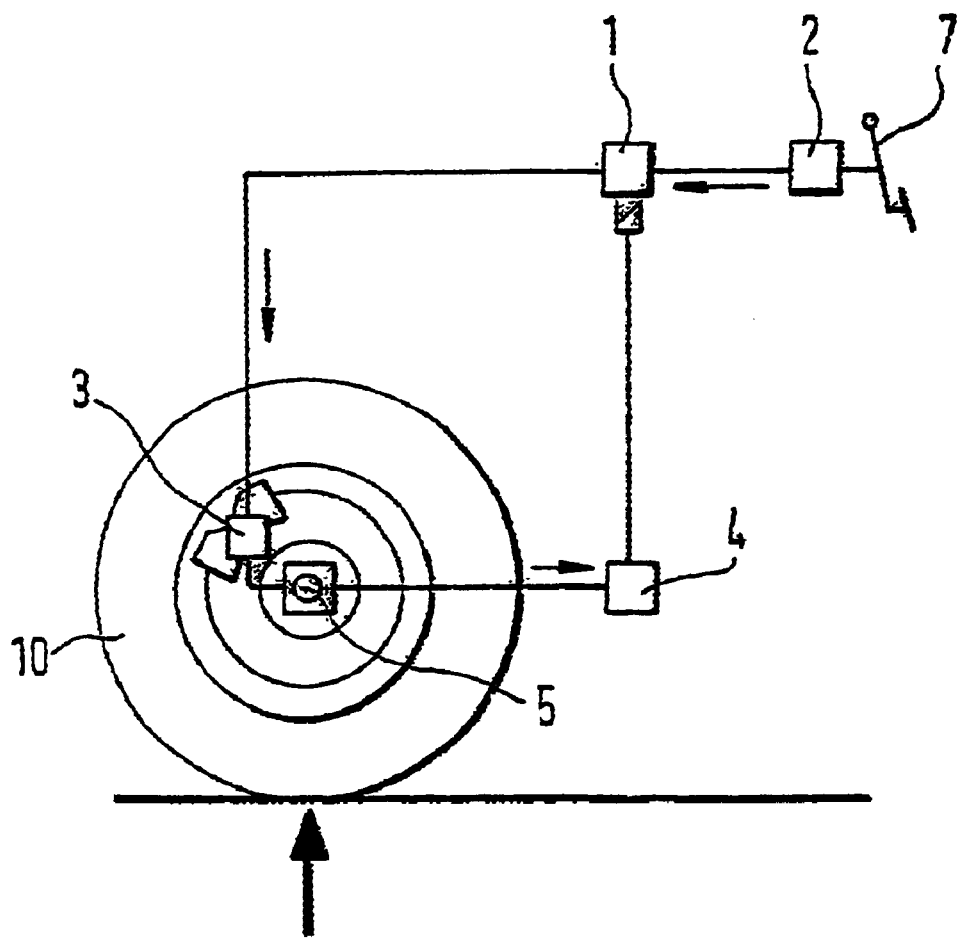

The present invention relates to a device and a method for controlling wheel slip for a motor vehicle according to the preamble of Patent claim 1 and the preamble of Patent claim 6, respectively.

Devices for controlling wheel slip are known in various designs. For example, such a device for controlling wheel slip can be an antilock braking system, also known as a brake-slip controller. With these means, the brake slip is controlled in a known manner by a reduction in braking pressure independently of the driver, such that the wheels braked by the driver are prevented from locking (antilock controller function, brake-slip controller function; ABS). The device for controlling wheel slip can also be designed as a traction controller, with which the drive slip of the driven wheels is controlled at least by a braking-pressure buildup carried out independently of the driver, such that the driven wheels are prevented from spinning, for example, during a standing start (traction controller function; TCS). It is furthermore conceivable that the device for controlling wheel slip is designed as a vehicle dynamics control {electronic stability program) or yaw-rate control (ESP) as is known, for example, from the publication "*FDR—Die Fahrdynamikregelung von Bosch*" (ESP—The Electronic Stability Program of Bosch) appearing in the Automobiltechnische Zeitschrift (ATZ) 96, 1994, issue 11, on pages 674 through 689.

The following explanations relate essentially to a device for controlling wheel slip, with which at least the brake slip is controllable. However, this is not intended to represent any restriction; the subject matter of the present invention can be utilized in all the devices for controlling wheel slip indicated above. A traction control system is usually combined with a brake-slip control. A vehicle dynamics control is composed first of all of a higher-level yaw-rate controller, and secondly of a brake-slip controller and a traction controller, both of which are subordinate to the yaw-rate controller. As further explained in the following, with a view to the subject matter of the present invention, the anti-lock control system, i.e. the brake-slip control on the one hand, and the traction control system or the vehicle dynamics control on the other hand differ first and foremost in the manner as to how the wheels are brought into high slippage or to locking in response to a detected skidding.

If a vehicle, which is not equipped with a device for controlling wheel slip by which at least the brake slip is controllable, goes into a skid when braking with locked wheels, then generally the moving direction of the motor-vehicle center of gravity existing prior to the skid is retained, since locked wheels are unable to transmit any lateral forces. In the same way, such a vehicle behaves so that the wheels lock when, unbraked, it goes into a skid because of exceeding vehicle-dynamic limits and the driver actuates the brakes during the skidding process.

A device for controlling wheel slip, with which at least the brake slip is controllable, prevents the triggering of a skidding process during braking as long as vehicle-dynamic limits (e.g. excessive curve speed) are not exceeded. However, if braking is carried out during a skidding process, or if a skidding process is triggered during a controlled braking, the wheels continue to be able to transmit lateral guiding forces because of the brake-slip control with which locking of the wheels is intended to be avoided. As long as the yaw velocity and the float angle of the vehicle are not too great, the driver, depending on his/her skill, is still able to hold the vehicle on the desired course. If the yaw velocity and float angle, respectively, exceed certain limits, then even the experienced driver may no longer be able to keep the skid under control.

In addition, because of the kinematics of a skidding process, with increasing float angle, the tires of a motor vehicle experience a decrease in the effective circumferential (longitudinal) force. The resulting reduction in pressure causes an increase in the lateral guiding forces at the front axle, whereby, depending on the adjusted steering angle, an uncontrollable change in the travel direction can result which further intensifies the skid.

The German Patent 42 19 750.3 describes an anti-lock control system for a motor vehicle that normally varies the braking pressure at the vehicle wheels depending on the motion behavior of the vehicle wheels (wheel deceleration, wheel acceleration and/or wheel slip), and upon detection of a vehicle skid, brings at least a part of the wheels into high slippage, preferably locks them, by a buildup of braking pressure, a prerequisite for the skid detection being that at least one rear wheel lies in a predefined deceleration band and pressure was reduced at it over a predefined time, a judgment of skidding being made when the two named conditions are present simultaneously and for a predefined time.

From PCT/EP89/00961, it is known to strongly brake (bring into high slippage) or to lock the front wheels in response to an unequivocal ascertainment of such a problematic driving situation, whereby the vehicle is able to re-orient itself in the direction of travel. An additional assistance can be provided by influencing the braking force at the rear wheels. To detect skidding, in this document, the sum of the differences of pressure reduction time minus pressure buildup time is determined at at least one front wheel and one rear wheel, the ascertained time being set in relationship with the total control time, and a judgment of skidding being made when this relationship exceeds a predefined value. This method is regarded as relatively costly, since the ascertainment of the relationship ties up computer capacity to a not inconsiderable extent.

In response to a detected vehicle skid, the front wheels are strongly braked. In this context, the braking of the front wheels should be so strong that they are able to transmit almost no lateral force. In the ideal case, the front wheels lock, i.e. because of the braking intervention at the front wheels, no lateral guidance exists at them any longer. Usually such braking interventions are not carried out at the rear wheels, that is to say, the rear wheels are not strongly braked. In the normal case, only braking interventions of the anti-lock braking system, i.e. the brake-slip control, are carried out at the rear wheels, that is, the wheels of the rear axle are in a stable state; they are able to transmit lateral forces. The result is that the rear axle of the vehicle forms a pole about which the vehicle can rotate. If one thinks of the time sequence with which the individual steps proceed, then it is comprehensible that the vehicle can orient itself again in the direction of travel. First of all, a vehicle skid is detected. This detection is carried out in such a timely manner that the vehicle still does not exhibit all too large an angle of rotation about its vertical axis relative to its original travel direction or orientation which existed prior to the start of the skid. That is to say, the vehicle still has not rotated all too much compared to its original travel direction. As soon as the skid is detected, the front wheels are strongly braked, which means no lateral guidance is present any longer at the front wheels. Since the rear wheels still exhibit the lateral forces which existed before the skid began, and therefore permit a lateral guidance, the vehicle is rotated about its rear axle back into the direction of travel.

If, in addition to the wheels of the front axle, the wheels of the rear axle are also brought into high slippage, i.e. locked, then the vehicle is no longer able to re-orient itself into its original direction of travel, that is, the rotation of the vehicle about its vertical axis is reduced or limited. In this case, the movement of the vehicle is led back to an essentially purely translatory movement. The movement of the vehicle in this case follows the movement of its center of gravity. As an example, if prior to the locking of the front wheels and rear wheels, the vehicle was cornering, then starting from the cornering, the vehicle continues to move on the tangent to the curve. The simultaneous braking of the front wheels and rear wheels is carried out with a view to damage limitation.

The object of the present invention is to provide a device for controlling wheel slip for motor vehicles, in which a skidding condition of the motor vehicle can be detected in a simple and inexpensive manner.

Starting from an antilock braking system or a brake-slip control, the use according to the present invention of wheel-speed sensors having direction-of-rotation detection provides a simple possibility for detecting a skid without additional costly sensors. It can thus be avoided that, in the event of a skidding process, the pressure in the wheel brake is reduced during the skidding on the basis of a false interpretation by a brake-slip control taking place. For example, in using inductive speed sensors, a direction-of-rotation detection can be implemented, for instance, by appropriate forming of the teeth of a rotor which are running past an induction coil. In addition to the suitable forming of the teeth, the direction of rotation can also be detected with the aid of a sensor which generates two phase-displaced signals or which provides digitalized signals, that is produced with the aid of trigger circuits from the signal generated by induction, as can be inferred from the Application filed under the file number DE 199 37 964.5 at the German Patent and Trademark Office.

Advantageous refinements of the device for controlling wheel slip according to the present invention are the subject matter of the dependent claims.

According to one preferred specific embodiment, the device for controlling wheel slip has means for braking the rear wheels in the event a skidding condition is detected. As described above, a translatory movement of the vehicle thereby results.

The device for controlling wheel slip according to the present invention expediently has means for stopping a brake-slip control taking place in the event a skidding condition is detected. By stopping the brake-slip control taking place, a buildup of the braking pressure over and above the locking braking pressure is permitted at least in the front wheels. The forestalling is achieved, for example, in that the trigger signals for the actuators assigned to the individual wheels are either not output by the brake-slip controller, or else signals which are predefined for the trigger signals and which lead to a quite specific triggering of the actuators are output. In the case of a hydraulic, an electrohydraulic, a pneumatic or an electropneumatic braking system, the actuators are solenoid valves. When working with an electromechanical braking system, they are electric servomotors.

If the device for controlling wheel slip is a pure brake-slip control, then the braking pressure increases at most to the pressure level selected by the driver, i.e. the driver admission pressure, which is present because of the actuation of the brake pedal. Therefore, if an actuation of the brake pedal exists, such that a brake-slip control would normally intervene, then by forestalling the brake-slip control, the braking pressure can be built up so far that the wheels lock. However, if a brake-pedal actuation exists which does not lead to an intervention by the brake-slip control, then it may be that the wheels cannot be locked by forestalling the brake-slip control, but can be brought into high slippage.

If the device for controlling the brake slip is a traction control system or a vehicle dynamics control, then a braking pressure or a braking force can be built up independently of the driver. If there is no actuation of the brake pedal by the driver, then a braking pressure or a braking force can be generated by a braking intervention carried out independently of the driver. If an actuation of the brake pedal already exists, then the braking pressure or the braking force can be increased over and above the level selected by the driver. That is to say, with a braking system which permits a buildup of the braking pressure or of the braking force independently of the driver, locking of the wheels can be achieved at any rate.

At this point, it should be mentioned that, starting from a brake-slip control, which is intended to be the basis of the exemplary embodiment, bringing into high slippage or locking of the front wheels is to be regarded quasi as a special operating mode of the brake-slip control, since such wheel conditions are originally supposed to be avoided by a brake-slip control.

Figure 2:
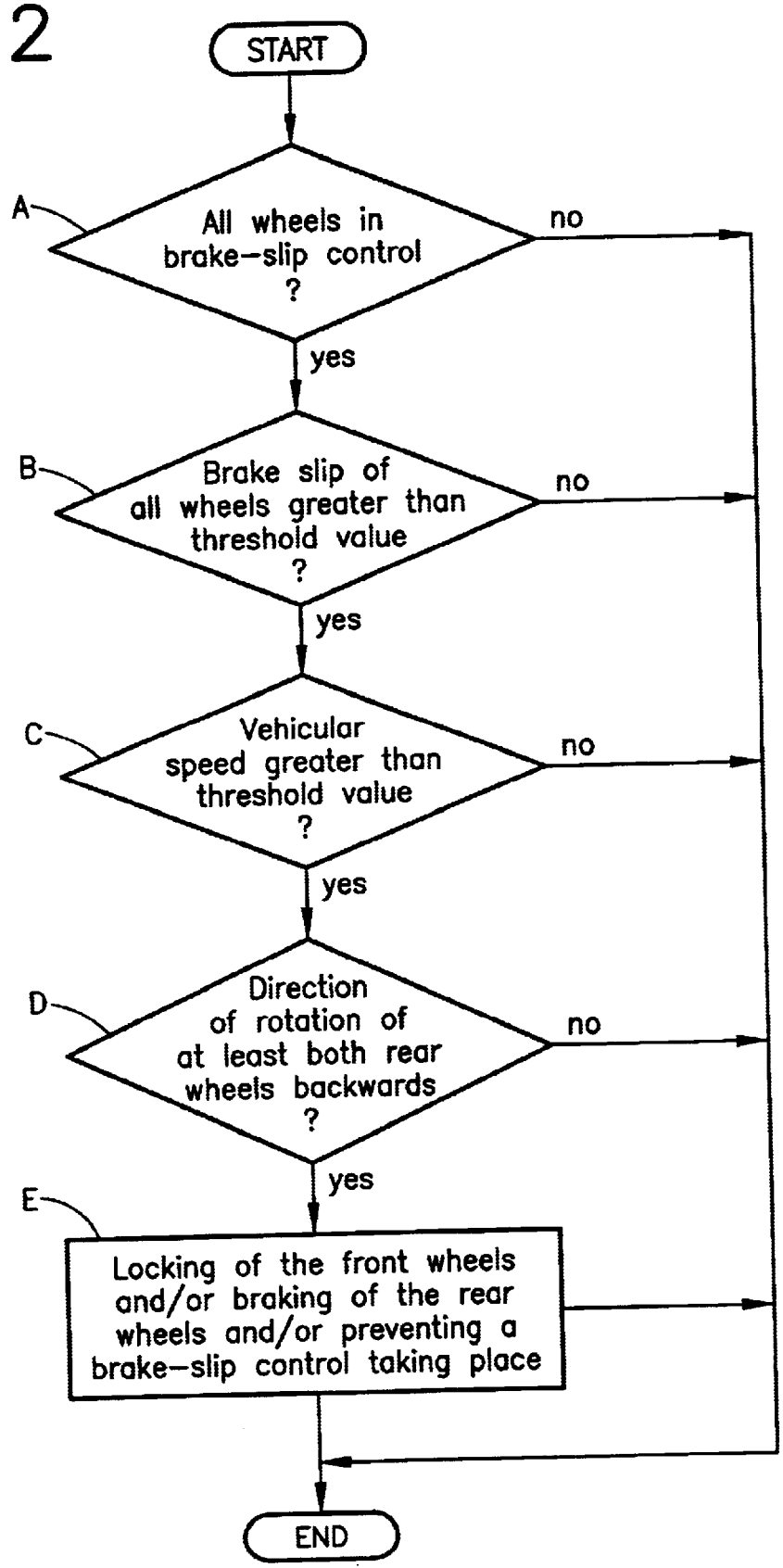

A preferred specific embodiment of the device according to the present invention for controlling wheel slip shall now be explained in detail with reference to the attached drawing, in which:

| | |
|---|---|
| FIG. 1 | shows a basic diagram for clarifying the essential components of the device according to the present invention for controlling wheel slip; and |
| FIG. 2 | shows a block diagram for the operation of a device according to the present invention for controlling wheel slip in order to avoid a skidding condition. |

In the following, FIG. 1 shall be discussed, the functioning method of the device for controlling wheel slip being described for the case of a hydraulically implemented brake-slip control. For the sake of clarity, only one wheel is shown in FIG. 1. This is not intended to represent any restriction. Naturally, the device for controlling wheel slip according to the invention can also be used for vehicles having any number of wheels.

The device shown in FIG. 1 for controlling brake slip, in response to a braking (by actuation of brake pedal 7 connected to a hydraulic modulator 1 and a master cylinder 2), regulates the braking pressure in respective brake cylinders 3 of vehicle wheels 10 as a function of wheel acceleration, wheel deceleration and wheel slip, respectively. To that end, wheel-speed sensors 5 deliver pulses for determining the respective wheel speed, which are supplied to an electronic control unit 4. In electronic control unit 4, the signals of wheel-speed sensors 5 are evaluated, the slippage permissible for optimal braking is ascertained, and the braking pressure is regulated in respective wheel-brake cylinders 3.

Hydraulic modulator 1 shown in FIG. 1 contains solenoid valves which, as far as their pin configuration is concerned, are allocated functionally to the individual wheel-brake cylinders. The hydraulic modulator likewise contains at least one pump with which at least braking medium from the wheel-brake cylinders can be delivered back into the master brake cylinder for avoiding a wheel lock. With the aid of this hydraulic modulator, the braking pressure can be held constant, lowered and raised again to the pressure level set by the driver in a known manner, independently of the driver.

If the device for controlling wheel slip is a traction control system or a vehicle dynamics control, then the hydraulic modulator has further solenoid valves allocated functionally to the master brake cylinder. By appropriate triggering of these valves and simultaneous actuation of the pump, the braking pressure can additionally be built up, still independently of the driver, over and above the pressure level set by the driver.

In the case of accelerative force, upon exceeding a threshold for the drive slip, braking pressure is built up in the brake cylinders of the driven wheels, independently of the driver, by a triggering, taking place in a known manner, of the valves and pump, respectively, contained in the hydraulic modulator. The drive slip is thereby reduced. The wheel speeds are evaluated in control unit 4 in the case of accelerative force, as well.

When working with a vehicle dynamics control, a deviation is formed between a yaw rate, measured with the aid of a suitable sensor, and a setpoint value for the yaw rate. This deviation is converted into setpoint slip values for the individual wheels, which are set by corresponding triggering of the valves and the pump.

According to the present invention, wheel-speed sensors 5 for detecting a skidding condition of the vehicle are designed with a device for detecting the direction of rotation.

The mode of operation of the device according to the present invention for controlling wheel slip shall now be explained with reference to FIG. 2. The control presented in FIG. 2 is useable in the same way for a motor vehicle having front-wheel drive or rear-wheel drive. In this connection, the sequence shown requires no adaptation to the respective type of drive. For the sake of completeness, it should be mentioned that for the case when a special adaptation to the drive concept of the vehicle is necessary or desirable, it is conceivable that the algorithm is adapted beforehand within the framework of the application.

In the case described in FIG. 2, it is determined in the sequence shown whether all wheels are in brake-slip control (step A), whether the brake slip of all wheels exceeds a threshold value (step B) and whether the vehicular speed exceeds a further threshold value (step C). If the answer to these conditions is affirmative, wheel-speed sensors 5 having direction-of-rotation detection are used to determine whether the direction of rotation of at least two rear wheels is running backwards, i.e. in the opposite direction (step D). If this condition is also affirmative, a skidding condition is inferred, and a locking of the front wheels and/or a braking of the rear wheels and/or a stopping of a brake-slip control of the motor vehicle taking place is initiated by the closed control loop shown in FIG. 1 (step E). That is, as already described, the braking pressure is increased for the front wheels. An additional braking of the rear wheels can be provided as a support. Stopping the brake-slip control taking place offers itself as an alternative. The processing is ended both following step E, as well as for the case when a query taking place in steps A, B, C and D, respectively is not satisfied. The processing starts anew at the beginning in response to the next call by the routine of the brake-slip controller.

Upon detection of the skidding condition, advantage is taken of the characteristic behavior of a vehicle during a skid: In the case of float angles of less than 90°, the wheel speeds slow down and finally come to a standstill because of the changing ratios of circumferential forces to lateral forces which act on the wheels. This holds true in particular for wheels of the non-driven axle. Above a float angle of 90°, the rotational direction of the wheels reverses and the vehicle moves backwards. This condition is recognized by wheel-speed sensors 5 having direction-of-rotation detection. If such a condition is reliably detected, this critical driving situation can be mitigated by the measure described of locking the front wheels, i.e. by sharp over-braking of the front wheels with the aid of the device for controlling brake slip. Uncontrollable vehicle motions can thereby be avoided, or a vehicle which has gone into a skid can be brought under control. Given suitable weighting of the speed and rotational direction information received from the front wheels and rear wheels, respectively, further critical driving conditions or maneuvers such as drifting can be effectively controlled or avoided, as well.

Additionally, a braking of the rear wheels can be provided. An alternative is to prevent the brake-slip control taking place.

What is claimed is:

1. A device for controlling wheel slip of individual wheels of a motor vehicle, comprising:

sensors configured to generate signals containing information about rotation directions and speeds of respective wheels, the signals being processed to detect a skidding condition;

a first structural arrangement to at least one of vary and set an applied brake pressure to a wheel as a function of a wheel movement behavior; and a second structural arrangement to brake at least one of: i) a set of front wheels, and ii) a set of rear wheels, if the skidding condition is detected;

wherein the second structural arrangement is operable to prevent operation of brake-slip control from occurring if the skidding condition is detected.

2. A device for controlling wheel slip of individual wheels of a motor vehicle, comprising:

sensors configured to generate signals containing information about rotation directions and speeds of respective wheels, the signals being processed to detect a skidding condition;

a first structural arrangement to at least one of vary and set an applied brake pressure to a wheel as a function of a wheel movement behavior; and a second structural arrangement to brake at least one of: i) a set of front wheels, and ii) a set of rear wheels, if the skidding condition is detected;

wherein to detect the skidding condition, it is determined whether rotation directions of at least two of the rear wheels are backwards.

3. A device for controlling wheel slip of individual wheels of a motor vehicle, comprising:

sensors configured to generate signals containing information about rotation directions and speeds of respective wheels, the signals being processed to detect a skidding condition;

a first structural arrangement to at least one of vary and set an applied brake pressure to a wheel as a function of a wheel movement behavior; and a second structural arrangement to brake at least one of: i) a set of front wheels, and ii) a set of rear wheels, if the skidding condition is detected;

wherein detecting the skidding conditions performed when at least the following are satisfied:
all wheels are in brake-slip control;
brake slip is greater than a corresponding threshold value for all the wheels; and
a vehicular speed is greater than another corresponding threshold value.

4. A method for controlling wheel slip of individual wheels of a motor vehicle, comprising:

providing, from wheel sensors, signals concerning rotation directions and speeds of respective wheels, the signals being processed to detect a skidding condition;

at least one of varying and setting a braking pressure applied to a wheel as a function of a wheel movement behavior, at least one of braking and locking at least one of: i) a set of front wheels, and ii) a set of rear wheels, of the motor vehicle if the skidding condition is detected; and preventing operation of brake-slip control if the skidding condition is detected.

5. A method for controlling Wheel slip of individual wheels of a motor vehicle, comprising:

providing, from wheel sensors, signals concerning rotation directions and speeds of respective wheels, the signals being processed to, detect a skidding condition;

at least one of varying and setting a braking pressure applied to a wheel as a function of a wheel movement behavior, and at least one of braking and locking at least one of: i) a set of front wheels, and ii) a set of rear wheels, of the motor vehicle if the skidding condition is detected;

wherein to detect the skidding condition, is determined whether rotation directions of at least two of the rear wheels are backwards.

6. A method for controlling wheel slip of individual wheels of a motor vehicle, comprising:

providing, from wheel sensors, signals concerning rotation directions and speeds of respective wheels, the signals being processed to detect a skidding condition;

at least one of varying and setting a braking pressure applied to a wheel as a function of a wheel movement behavior, and at least one of braking and locking at least one of: i) a set of front wheels, and ii) a set of rear wheels, of the motor vehicle if the skidding condition is detected;

wherein detecting the skidding conditions performed when the following are satisfied:
all wheels are in brake-slip control;
brake slip is greater than a corresponding:shreshold value for all the wheels; and
a vehicular speed is greater than another corresponding threshold value.

* * * * *